June 24, 1930.  F. C. CZEMBA ET AL  1,765,907
ROLLING MILL HOUSING
Filed May 11, 1927  2 Sheets-Sheet 1
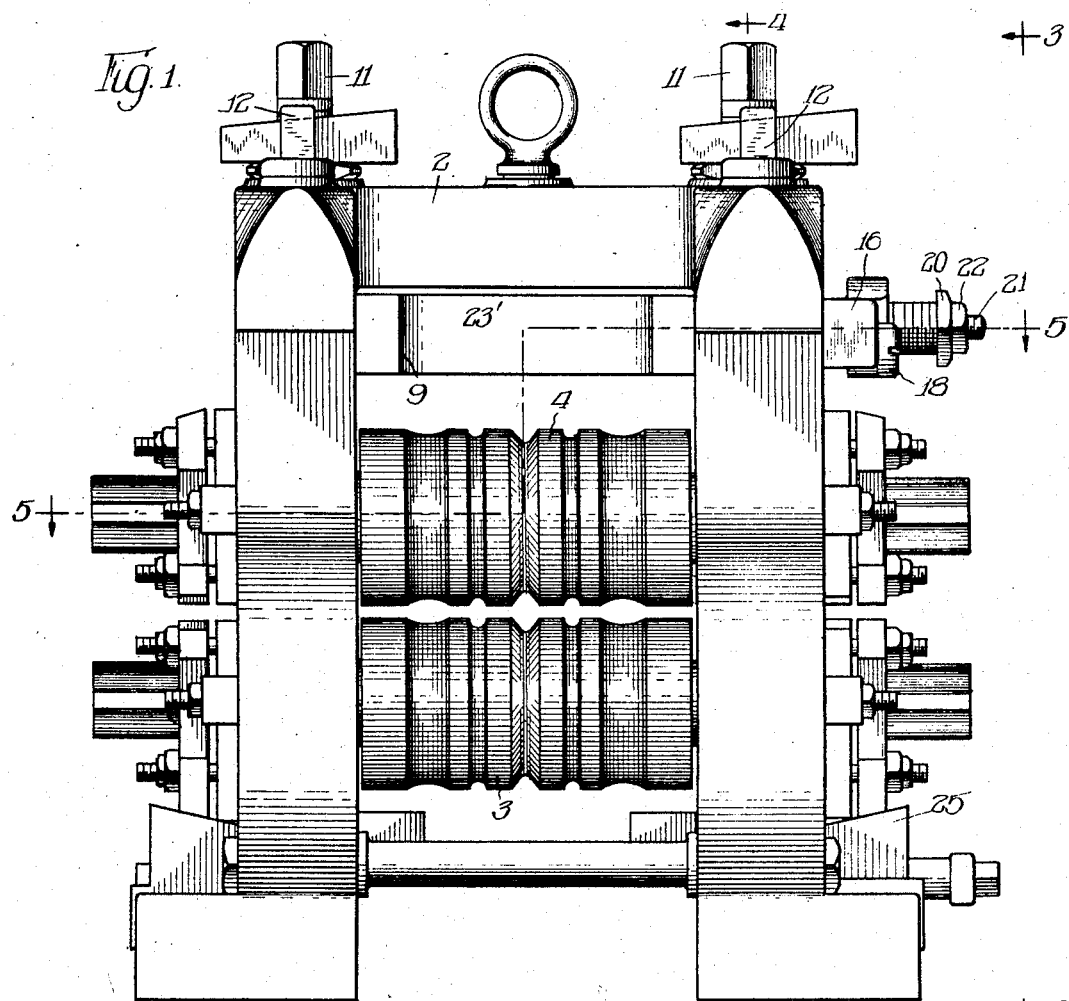
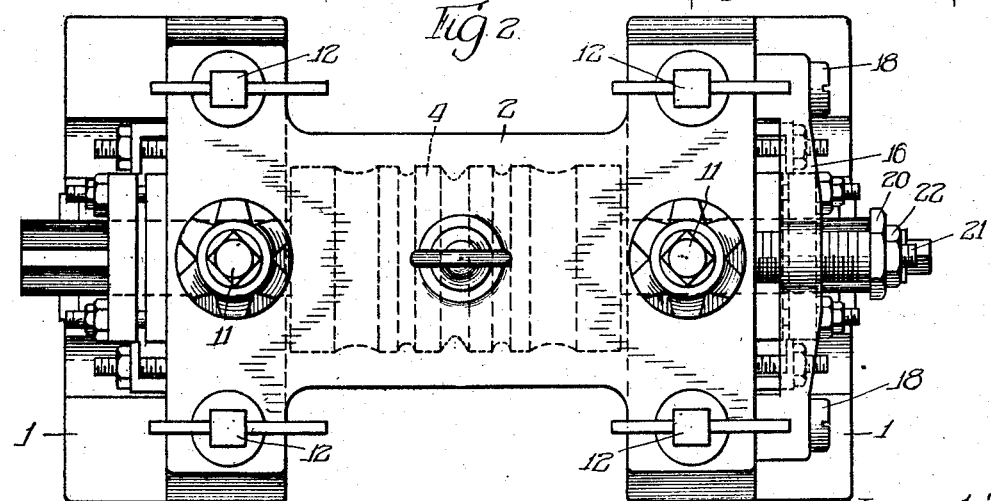
Witness:
R. Burkhardt
Inventors:
Frank C. Czemba,
Henry W. Wilson,
By D. Anthony Usina
atty.

June 24, 1930. F. C. CZEMBA ET AL 1,765,907
ROLLING MILL HOUSING
Filed May 11, 1927 2 Sheets-Sheet 2
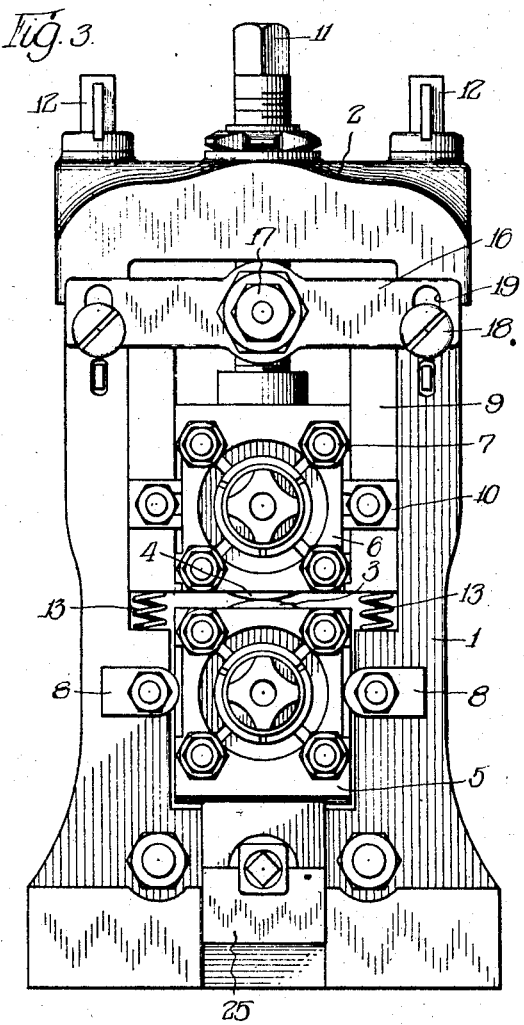
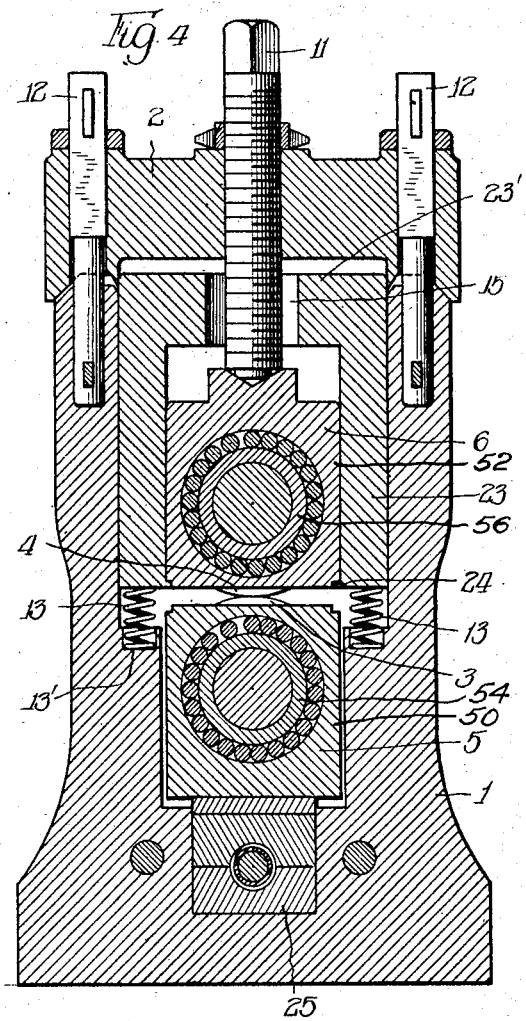
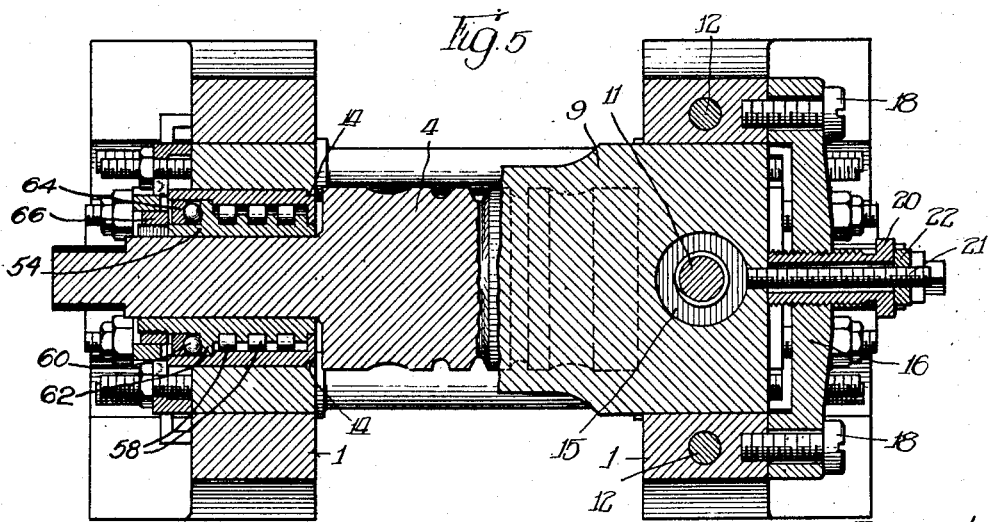
Inventors:
Frank C. Czemba,
Henry W. Wilson,
By D. Anthony Nima atty.
Witness:
P. Burkhardt.

Patented June 24, 1930

1,765,907

UNITED STATES PATENT OFFICE

FRANK C. CZEMBA AND HENRY W. WILSON, OF DULUTH, MINNESOTA

ROLLING-MILL HOUSING

Application filed May 11, 1927. Serial No. 190,457.

The invention pertains to a rolling mill, and more particularly to a novel yoke and suspending cradle used for more readily adjusting the rolls.

In the usual rolling mill, the contours of the parts wear out of alignment; also, the bearings wear, which causes the rolls to shift out of alignment. The adjustment of this misalignment is usually taken up by means of screws disposed at the ends of the roll bearings, the adjusting screws on the far bearing being loosened, those on the near bearing being tightened, and vice versa, thereby moving the one roll longitudinally to bring it to alignment with the other roll. Adjustment for wear of the bearing is made by tightening the bearing adjusting screws, thereby forcing the bearing against the end of the roll, which in turn forces the roll against the other bearings, which may effect the alignment of the rolls and make further adjustment necessary. Such adjustment is usually very difficult due to the weight of the parts to be moved, and it is not unusual to require two men on a six-foot wrench to adjust a single screw.

It is, therefore, an object of the present invention to provide a novel suspension and adjusting means for a rolling mill which will have but few parts to effect adjustment for the rolls.

Another object is to provide an adjustable cradle particularly for an upper roll which will make it possible for the lower roll to be non-adjustable in the direction of its length, thereby insuring a simpler and more positive means of alignment.

A further object is to provide stops on the mill frame for taking any thrust of the stationary roll, which thrust may be caused either by operation or by adjustment.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a side elevation of a two-high rolling mill;

Figure 2 is a top plan view of Figure 1;

Figure 3 is an end elevation of the rolling mill illustrated in Figure 1 and taken in the direction as indicated by the arrows 3—3 of Figure 1;

Figure 4 is a sectional elevation taken substantially on the line 4—4 of Figure 1; and Figure 5 is a cross sectional plan taken substantially on the line 5—5 of Figure 1.

In the invention, as already pointed out, a two-high rolling mill is illustrated wherein 1 represents the rolling mill housing and 2 the housing cap, said cap being positioned on and fastened to the housing by the usual cap bolts 12. Bottom and top rolls 3 and 4 respectively are provided on the mill, which rolls are positioned in the housing by means of adjustable bearings 5 and 6 respectively, said bearings being provided with the usual adjusting bolts 7, and the lower roll bearing being held to the housing by the usual clamps 8. The bearings are preferably of the anti-friction type and as shown include the bearing housings 50 and 52 forming the outer race rings and sleeves 54 and 56 forming the inner race rings. Rollers 58 are provided between the race rings in proper channels formed therein for separation of the roller elements, said rollers providing means for transmitting the vertical load from said rolls to said housing. Roller bearings 60 are provided between a portion 62 of the inner race ring and a race ring 64 held between the race rings of the rollers and secured by collars 66, and provide means for transmitting the end thrust of said rolls to their respective bearing housings and thence to the rolling mill housing. It will be seen that the top roll is positioned in the cradle or yoke 9 which is provided with depending portions 23 which are substantially U-shape in cross section and which are adapted to embrace the top bearing 6, said bearing being held against longitudinal movement of the roll by means of the clamps 10. The U-shaped portions of the cradle are preferably integral with the longitudinally extending portion 23' connecting the bearing embracing portions of said cradle.

It is found desirable to provide the bearing embracing portions 23 of the cradle with lugs 24 which limit the downward movement of the bearing with respect to the cradle. Vertical movement of the bearing in the cradle is limited by head screws 11 which are carried on the bearing cap and extend through an enlarged aperture 15 in the portion 23' of the cradle allowing longitudinal movement thereof. Longitudinal movement of the cradle, and consequently the upper roll, is provided by a yoke 16 disposed at one end of the cradle housing and carried thereby, said yoke being provided with slots 19 for engagement with bolts 18 carried by the bearing housing and fastening said yoke to said bearing housing, it being understood that a similar yoke may be provided at the other end for similar operation. The longitudinal movement between the cradle and the yoke is effected by any suitable means 17, which in the embodiment shown, comprises a hollow screw 20 which is threaded into the yoke and through which extends the cradle screw 21 which is provided with the lock nut 22.

The bottom part of the housing on either side of the lower bearing and in way of the depending arms 23 of the cradle is provided with the sockets 13' in which springs 13 are provided which extend between the cradle and the bottom housing. The bottom housing is also provided with vertically extending lugs 14 which are provided in way of the lower bearings 5 to take up any end thrust of said bearings. The usual adjusting mechanism 25 may also be provided for the purpose of raising and lowering the lower roll vertically.

In the adjusting operation of the roll, it will therefore be seen that due to the lugs 14 engaging with the lower bearings 5 that longitudinal movement of the lower roll is impossible and therefore, any adjustment may be quite easily taken by means of the yoke and cradle provided. The adjustment of the bearings through bearing bolts 7 or the adjustment of the lower rolls through adjusting mechanism 25, will not be described as the invention is not dependent thereon. In adjusting the upper roll, it will be seen that it is only necessary to loosen the lock nut 22 and to simply adjust the cradle carrying the upper roll by means of the yoke screw 20, thereby aligning the rolls, after which the lock nut 22 is tightened, movement of the cradle being allowed due to the fact that the holes 15 provided in the cradle are larger than the head screws 11.

The pressure due to rolling the steel is always vertical and this trust is taken against the cradle under the cap, and the sole function of the springs is to keep the upper roll lifted to keep it in its proper position, and it will be readily understood that when the head screws are released, the upper roll is raised by the action of said springs, thus maintaining the top roll in raised position.

It will be seen that in the suspension of the rolls shown in the present invention that pressure exerted upon the bearing holding lugs will not be transmitted from the bearing to the roll across the housing to the other roll but will be transmitted directly from the roll to the cradle housing, thus taking strain from the rolls themselves.

It will be understood that the embodiment shown is merely by way of illustration and not by way of limitation, as many forms of the devices shown may be used, and also said devices may be provided for any other rolling mills, such as those of the three-high type, etc., or they may be provided for analogous machines, such as bending rolls and the like.

We claim:

1. In a device of the character described, the combination with rolls, one of which is adjustable and the other of which is nonadjustable in the direction of its length, adjustable bearings for said rolls, a cradle, and a yoke for adjustingly cooperating with said cradle to align said adjustable roll with respect to the other roll.

2. In a device of the character described, the combination with rolls, one of which is adjustable and the other of which is nonadjustable in the direction of its length, adjustable bearings for said rolls, a cradle for the adjustable roll, resilient means between said cradle and the mill housing, and a yoke for adjustingly cooperating with the cradle to align the adjustable roll with respect to the other roll.

3. In a roll carriage, the combination of a housing, a cradle resiliently supported thereby, a roll supported in bearings by said cradle, means for imparting vertical movement to said roll, and means for imparting longitudinal movement to said cradle.

4. In a roll carriage, the combination of a housing, a cradle resiliently supported thereby, a roll supported in bearings by said cradle, means on said bearings and cradle for preventing longitudinal movement between said roll and cradle, means for imparting vertical movement to said roll, and means for imparting longitudinal movement to said cradle.

5. In a roll carriage, the combination of a housing, a cradle resiliently supported thereby, a roll supported in bearings by said cradle, means on said bearings and cradle for preventing longitudinal movement between said roll and cradle, means extending through but independent of said cradle for imparting vertical movement to said roll.

and means for imparting longitudinal movement to said cradle.

6. In a roll carriage, the combination of a housing, a cradle resiliently supported thereby, a roll supported in bearings by said cradle, means for imparting vertical movement to said roll, means for imparting longitudinal movement to said cradle, rolling means carried by the housing cooperating with said roll, and means for adjusting said rolling means with respect to said roll.

7. In a rolling mill, the combination of a housing, a roll cradle resiliently supported in said housing, means for moving said cradle in a plurality of directions with respect to said housing, a roll provided with bearings carried by said cradle, said bearings having a housing movably mounted in said cradle, said cradle being provided with members for limiting the movement of said housing in one direction and preventing relative movement between said housing and cradle in another, said bearings including roller and ball bearings, said roller bearings being disposed to transmit vertical load from said rolls to said housing and said ball bearings being disposed to transmit the end thrust from said rolls to said housing, a roll cooperating with said before mentioned roll and being provided with a bearing housing mounted in said first-named housing for restrictive movement therein, and means for moving said last-named roll.

8. In a rolling mill, the combination of a housing, a roll cradle resiliently supported in said housing, means for moving said cradle in a plurality of directions with respect to said housing, a roll provided with bearings carried by said cradle, said bearings having a housing movably mounted in said cradle, said cradle being provided with members for limiting the movement of said housing in one direction and preventing relative movement between said housing and cradle in another, said bearings including roller and ball bearings, said roller bearings being disposed to transmit vertical load from said rolls to said housing and said ball bearings being disposed to transmit the end thrust from said rolls to said housing, a roll cooperating with said before-mentioned roll and being provided with a bearing housing mounted in said first-named housing for movement only toward said first named roll, said bearing housing being provided with roller and ball bearings, said roller bearings being disposed to transmit vertical load from said rolls to said housing and said ball bearings being disposed to transmit the end thrust from said rolls to said housing, and means for moving said last named roll.

9. In a rolling mill, the combination of a housing, a roll cradle resiliently supported in said housing, means for moving said cradle longitudinally of said housing, a roll provided with bearings carried by said cradle, said bearings having a housing movably mounted in said cradle, said cradle being provided with members for limiting the movement of said housing in one direction and preventing relative movement between said housing and cradle in another, means for moving said second named housing and cradle in said first named housing, a roll cooperating with said before mentioned roll and being provided with a bearing housing mounted in said first named housing for restrictive movement therein, and means for moving said last named roll.

10. In a rolling mill, the combination of a housing, a roll cradle resiliently supported in said housing, means for moving said cradle longitudinally of said housing, a roll provided with bearings carried by said cradle, said bearings having a housing removably mounted in said cradle, said cradle being provided with members for limiting the movement of said housing in one direction and preventing relative movement between said housing and cradle in another, means for moving said second named housing and cradle in said first named housing, said bearings including roller and ball bearings, said roller bearings being disposed to transmit vertical load from said rolls to said housing and said ball bearings being disposed to transmit the end thrust from said rolls to said housing, a roll cooperating with said before mentioned roll and being provided with a bearing housing mounted in said first named housing for restrictive movement therein, and means for moving said last named roll.

11. In a rolling mill, the combination of a housing, a roll cradle resiliently supported in said housing, means for moving said cradle longitudinally of said housing, a roll provided with bearings carried by said cradle, said bearings having a housing movably mounted in said cradle, said cradle being provided with members for limiting the movement of said housing in one direction and preventing relative movement between said housing and cradle in another, means for moving said second named housing and cradle in said first named housing, said bearings including roller and ball bearings, said roller bearings being disposed to transmit vertical load from said rolls to said housing and said ball bearings being disposed to transmit the end thrust from said rolls to said housing, a roll cooperating with said before mentioned roll and being provided with a bearing housing mounted in said first named housing for movement only toward said first named roll, said bearing housing being provided with roller and ball bearings, said roller bearings being disposed to transmit vertical load from said rolls to said housing and said ball bearings being disposed to transmit the end thrust from said rolls to said housing, and means for moving said last named roll.

Signed at Duluth, Minnesota, this 30th day of April, 1927.

FRANK C. CZEMBA.
HENRY W. WILSON.